W. M. SHALLCROSS.
DYNAMOMETER.
APPLICATION FILED DEC. 3, 1915.
1,354,698.
Patented Oct. 5, 1920.
7 SHEETS—SHEET 1.
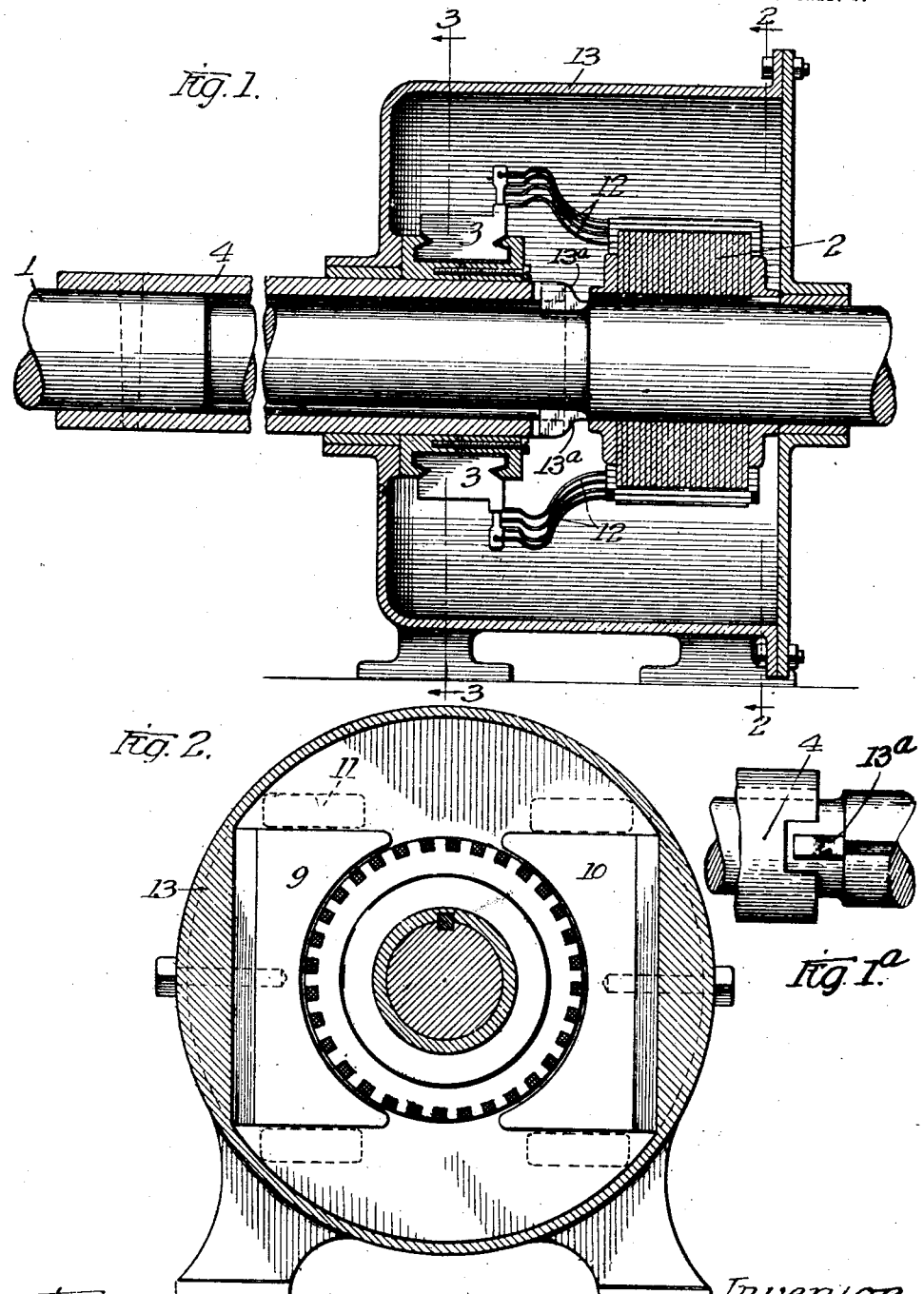

W. M. SHALLCROSS.
DYNAMOMETER.
APPLICATION FILED DEC. 3, 1915.
1,354,698.
Patented Oct. 5, 1920.
7 SHEETS—SHEET 2.
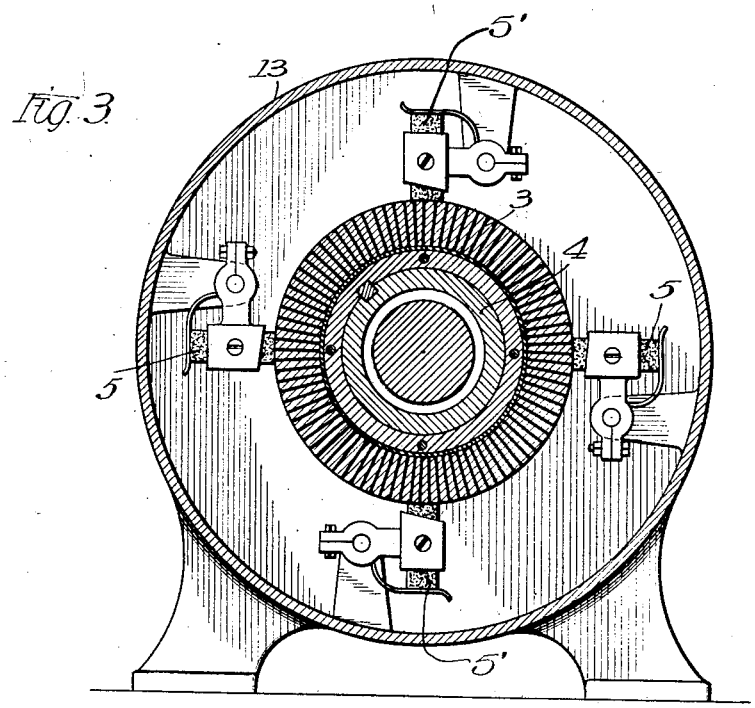
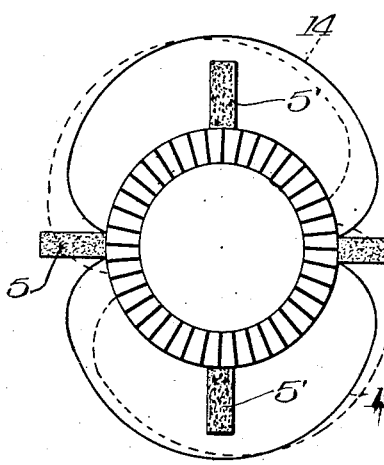
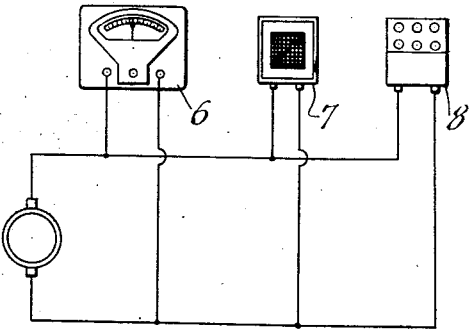
Witnesses:
Robert H. Weir
Arthur W. Carson
Inventor
Wilmer M. Shallcross
Edwin B. H. Tower Jr. Atty.

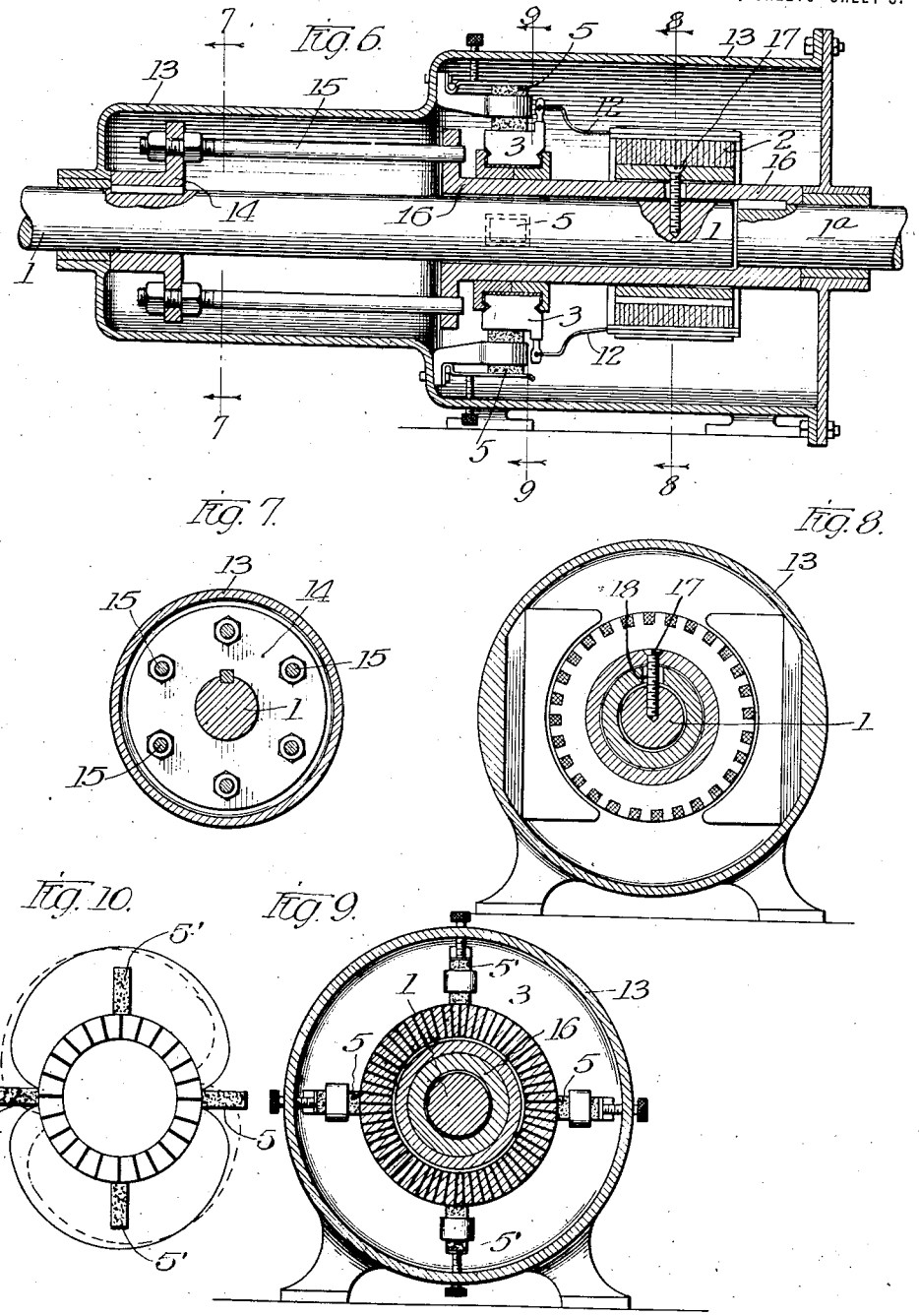

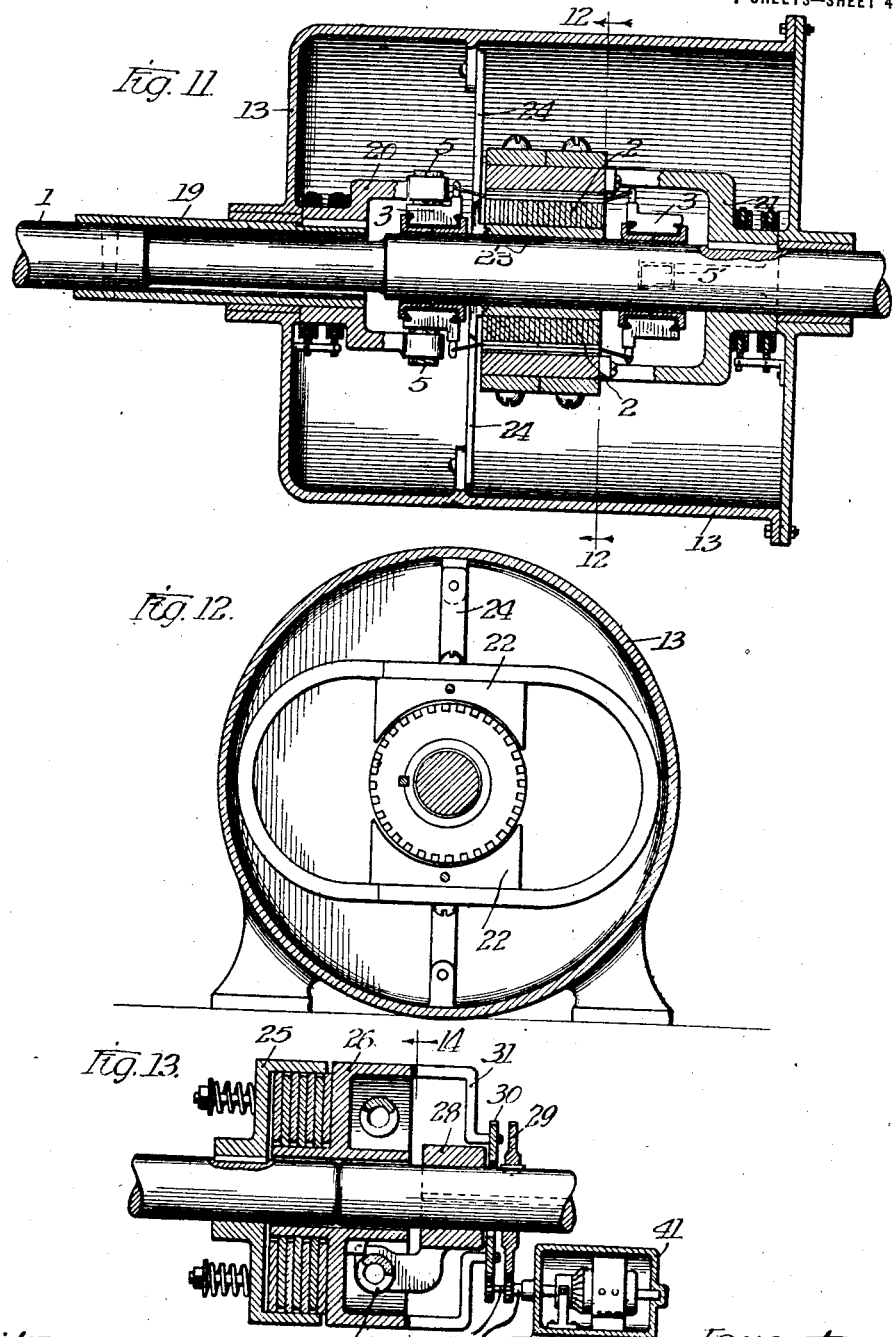

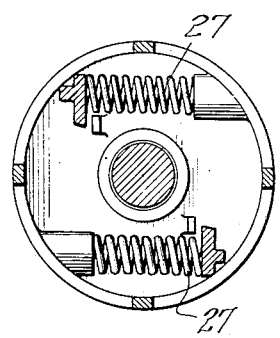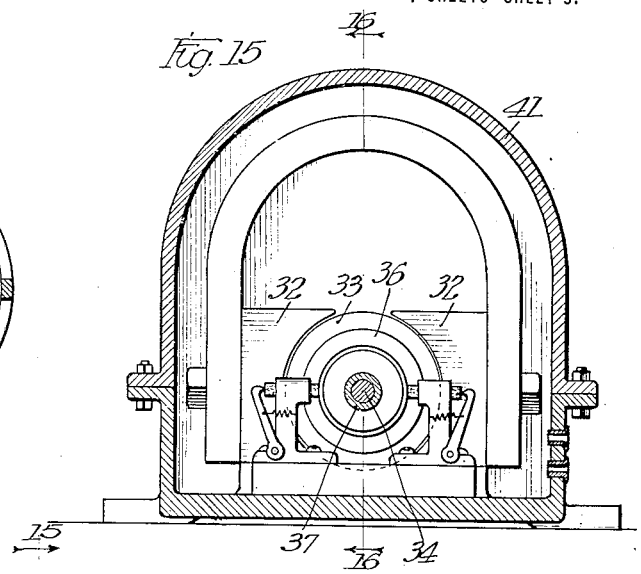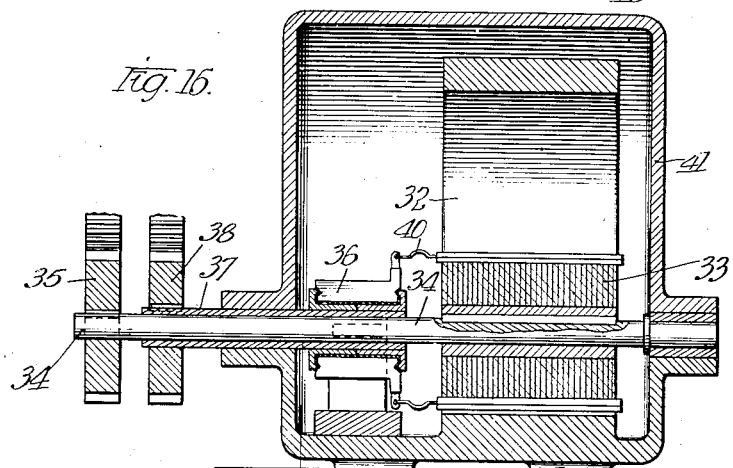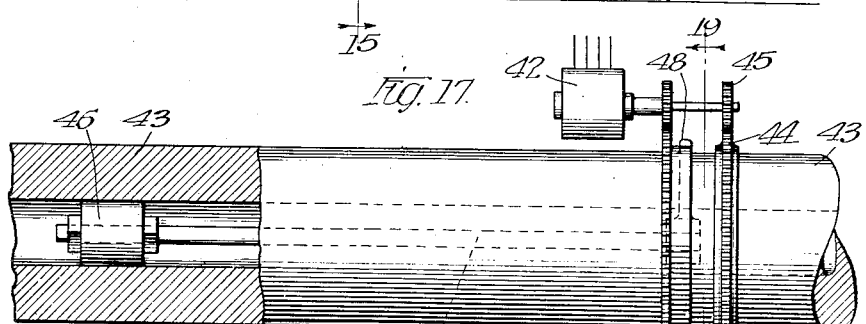

W. M. SHALLCROSS.
DYNAMOMETER.
APPLICATION FILED DEC. 3, 1915.
1,354,698.
Patented Oct. 5, 1920.
7 SHEETS—SHEET 6.
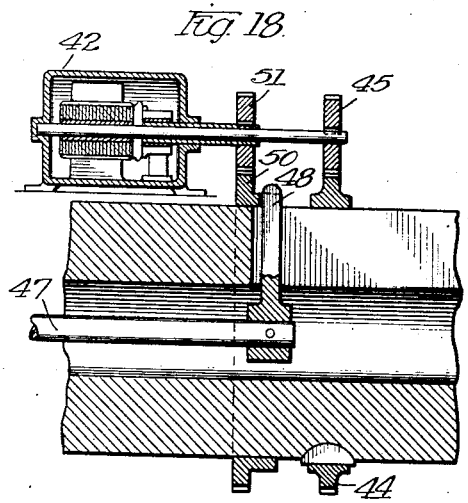
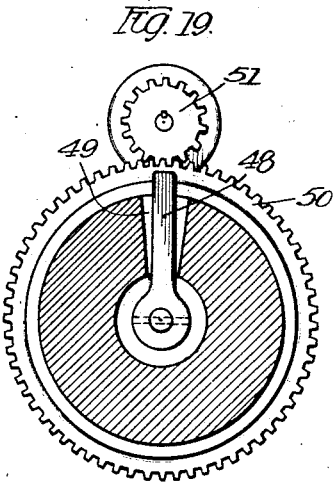
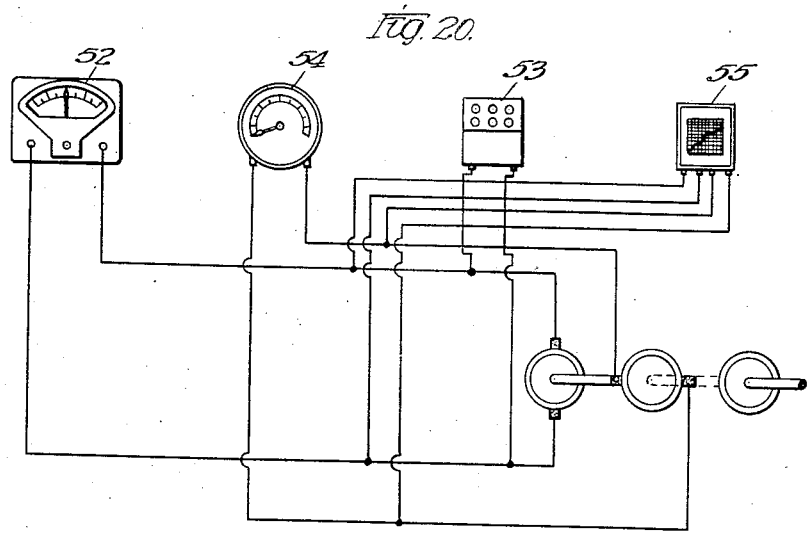
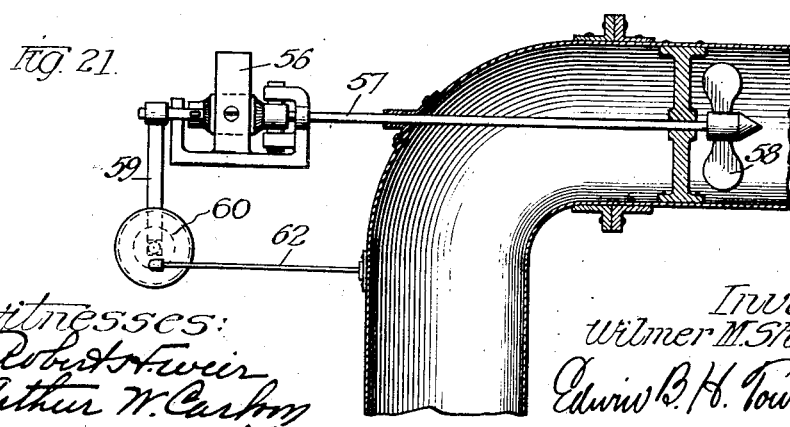
Witnesses:
Inventor
Wilmer M. Shallcross

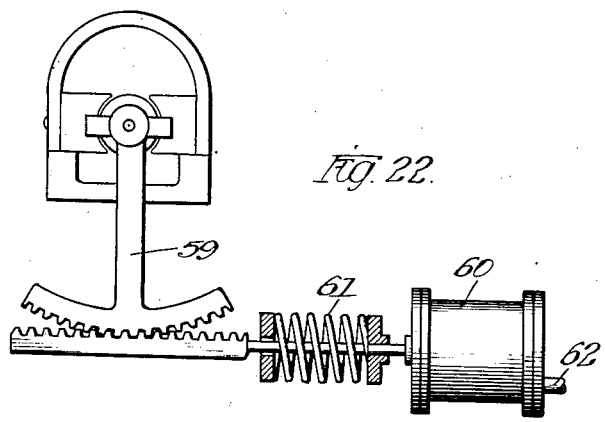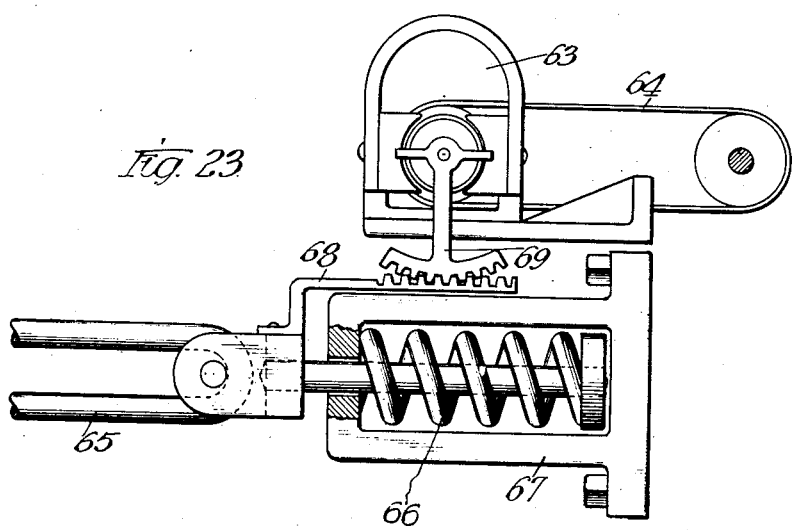

UNITED STATES PATENT OFFICE.

WILMER M. SHALLCROSS, OF MILWAUKEE, WISCONSIN.

DYNAMOMETER.

1,354,698.  Specification of Letters Patent.  Patented Oct. 5, 1920.

Application filed December 3, 1915. Serial No. 64,863.

*To all whom it may concern:*

Be it known that I, WILMER M. SHALLCROSS, a citizen of the United States, residing at Milwaukee, in the county of Milwaukee and State of Wisconsin, have invented new and useful Improvements in Dynamometers, of which the following is a specification.

This invention relates to dynamometers.

Various mechanisms have been devised for measuring the power of a continuously moving body. These mechanisms are generally built especially for the device to which they are to be applied and cannot be readily adapted for other uses. They also generally include numerous complicated and expensive parts which require frequent adjustment and constant attention.

It is important and desirable that a simple dynamometer be devised applicable to various moving bodies for indicating and recording the power of the moving body at any instant. It is also important that this dynamometer be constructed so that it can be applied to the moving body without requiring alterations in said body. The apparatus should be compact, rugged, inexpensive and efficient. The present invention is directed to these ends.

One of the objects of the invention is to provide improved means for measuring power.

Another object is to provide an improved dynamometer which may be readily applied to various moving bodies or mechanisms for measuring the power thereof.

Another object is to provide a dynamometer which may be applied to a rotating shaft without requiring that the shaft be severed.

Another object is to provide improved power measuring means with which simple and efficient electrical measuring instruments may be employed.

A further object is to provide a direct current electrical dynamometer to indicate directly the power of a revolving shaft or other moving body.

Another object is to provide a simple and comparatively inexpensive dynamometer which may be readily manufactured and easily applied to the mechanism whose power is to be measured.

Other objects and advantages of the invention will hereinafter appear.

The views of the drawing are—

Figure 1 is a cross-section of a dynamometer applied to a rotating shaft.

Fig. 1ᵃ is a plan of a portion of the shaft.

Fig. 2 is a vertical section on the line 2—2 of Fig. 1.

Fig. 3 is a vertical section through the commutator on the line 3—3 of Fig. 1.

Fig. 4 shows diagrammatically the voltage curves of the dynamometer.

Fig. 5 is a diagram of the connections to the measuring instruments.

Fig. 6 is a cross-section of a dynamometer applicable to a divided shaft.

Fig. 7 is a vertical section on the line 7—7 of Fig. 6.

Fig. 8 is a vertical section on the line 8—8 of Fig. 6.

Fig. 9 is a vertical section on the line 9—9 of Fig. 6.

Fig. 10 shows diagrammatically the voltage curves of the dynamometer shown in Fig. 6.

Fig. 11 is a cross-section of a further modification.

Fig. 12 is a vertical section on the line 12—12 of Fig. 11.

Fig. 13 is a cross-section of a dynamometer associated with two shafts coupled by a disk clutch.

Fig. 14 is a vertical section on the line 14—14 of Fig. 13.

Fig. 15 is an enlarged section of the electrical machine shown in Fig. 13.

Fig. 16 is a section on the line 16—16 of Fig. 15.

Fig. 17 is a side elevation partly in section of a dynamometer applied to a propeller shaft.

Fig. 18 is an enlarged longitudinal cross-section of the dynamometer shown in Fig. 17.

Fig. 19 is a vertical section on the line 19—19 of Fig. 17.

Fig. 20 is a circuit diagram of a system of connections which may be used with the dynamometer shown in Fig. 17.

Fig. 21 illustrates a dynamometer applicable to a flowing stream of fluid.

Fig. 22 is an end elevation of the dynamometer shown in Fig. 21.

Fig. 23 shows a dynamometer applied to the draw-bar of a locomotive or the like.

The dynamometer comprises, in general, a direct current dynamo having a portion thereof arranged to rotate in response to the speed of the body whose power is to be measured, certain parts of the dynamo being adapted to change their relative positions in response to the force of the moving body so that the energy delivered by the dynamo is proportional to the power of the moving body. Suitable instruments are provided for measuring the energy output of the machine, which instruments may be calibrated to read directly in power units.

The dynamometer shown in Figs, 1 to 5, inclusive, will be first described.

This form is applicable to an integral rotating shaft 1 and comprises, in general, a direct current armature 2 supported at one point on the shaft, a commutator 3 supported by a sleeve 4 attached to the shaft at a point removed from the point of attachment of the armature and stationary brushes 5 electrically connected to suitable instruments 6, 7 and 8, which measure the energy delivered by the machine.

The armature 2 is of any suitable construction. It is connected to the shaft 1 and rotates between field poles 9 and 10, which may be either permanent magnets or poles excited by suitable windings 11, shown in dotted lines in Fig. 2. The armature and the field pole construction may be varied to meet the requirements of different operating conditions.

The commutator 3 comprises a plurality of conducting segments suitably insulated and supported on the sleeve 4 so as to rotate therewith. The armature conductors are connected to the commutator segments by flexible conductors 12 so that the armature and commutator may move relative to each other.

The brushes 5 are supported in stationary position and they normally bear on the commutator at points of zero voltage as shown in the diagram in Fig. 4. The brushes are of any suitable type, being supported by brackets attached to the housing or to any other stationary part of the mechanism.

The commutator, the armature and the field poles are inclosed in a suitable housing 13 which protects the parts and gives the machine a finished appearance.

The operation of the dynamometer is as follows:

When the shaft is driving a load, the portion thereof between the point of attachment of the sleeve 4 and the point of attachment of armature 2, is subjected to a turning movement which causes a torsional twist in this section of the shaft and moves the armature and commutator relative to one another. The effect of this movement is to shift the voltage curve of the commutator so that the brushes 5 are no longer in the zero-voltage position. This change in the voltage curve is illustrated diagrammatically in Fig. 4. The machine is designed so that its voltage curve rises rapidly in a practically straight line from the zero-voltage point. The increase in voltage is thus directly proportional to the twist. A current is accordingly delivered to the circuit connected to the brushes whose voltage is proportional to the relative movement of the armature and commutator and to the speed of rotation of the shaft. The energy delivered to the brush circuit is thus a function of the speed and torque of the moving shaft or, in other words, the power of said shaft.

Suitable instruments are provided in the circuit of the brushes to measure the energy delivered. These may be calibrated to read directly in power units. Several of these instruments are illustrated in Fig. 5. A voltmeter 6 is shown which may be calibrated to read directly in horse power. A recording voltmeter 7 may be employed to record the power at any instant. A volt-hour-meter 8 may also be used to measure the total power over a period of time. Various other instruments may be used and calibrated as desired.

In order to prevent the shaft being strained beyond its elastic limit between the points of attachment of the armature 2 and the sleeve 4, the sleeve 4 is extended beyond the inner edge of the commutator 3, and slotted as shown in Figs. 1 and 1$^a$. A key 13$^a$ is fixed to the shaft and arranged to extend into the slot. The slot is, of course, wider than the key to allow relative movement of the parts, its width being gaged so that the key strikes the edge of the slot before the shaft is twisted to its elastic limit. The sleeve 4 and key 13$^a$ thereby become, in effect, a part of the shaft after the latter has twisted a certain amount. An automatic stop is thus provided for insuring that the shaft is not twisted to such an extent as to impair the accuracy of the apparatus. Various changes may be made in the arrangement of parts which provide the automatic safety stop, but such are included within the scope of the above disclosure. This feature may also be applied to any of the various modifications of the apparatus herein illustrated and described.

An additional pair of brushes 5' may be provided for measuring directly the speed of the shaft. These are located at right angles to the brushes 5 in order not to be appreciably affected by changes in the voltage curve of the commutator. The voltage delivered to the brushes 5' is directly proportional to the speed of rotation of the shaft.

The dynamometer shown in Fig. 6 is especially applicable to a divided shaft.

This form has a collar 14 keyed to the driving shaft 1 at a point removed from its end. The collar has a plurality of rods 15 bolted to it which are fixed in a flange on a sleeve 16, which in turn is keyed to the driven shaft 1ª. The sleeve 16 carries the commutator 3 upon which bear the brushes 5 held by stationary supports attached to the dynamometer housing 13. The armature 2 is mounted loosely on the sleeve 16 but is rigidly attached to the end of the driving shaft 1 by a screw, bolt or other fastening means 17, which passes through a slot 18 in the sleeve 16. The slot 18 is larger than the bolt so that the armature 2 may move freely relative to the sleeve 16, which carries the commutator. The commutator bars are connected to the armature conductors by flexible leads 12 to allow relative movement of the armature and commutator. The screw-bolt 17 is adapted to strike the edge of the slot in the sleeve 16 and act as a safety stop for preventing the structure connecting the two shafts being strained beyond its elastic limit.

The operation of this form of dynamometer is in general, similar to that of the one previously described. The driving shaft 1 is connected to the driven shaft 1ª through the collar 14, the rods 15 and the sleeve 16. The torsional twist of the connecting structure moves the commutator 3 relative to the shaft 1. The armature 2, which is rigidly connected with the free end of shaft 1, is not responsive to this twist with the result that the commutator is moved relative to the armature an amount corresponding to the torsional twist, or torque of the shaft. The change in position of the voltage curve of the commutator is illustrated diagrammatically in Fig. 10.

An additional pair of brushes 5' is also shown in this form for indicating speed. These brushes are located at right angles to the other set so that they are not affected by the shifting voltage curve of the commutator. The dynamometer may thus be used for indicating the speed of rotation of the shaft as well as the power being transmitted. It should be understood that an extra set of brushes for indicating speed may be used with any of the various forms of the dynamometer.

Figs. 11 and 12 illustrate a dynamometer in which the field and brushes are moved relative to one another with the armature and commutator stationary. The shaft 1 is integral in this form and it has keyed to it at one point a sleeve 19 which carries a support 20 for the brushes 5. Fixed to the shaft at another point at some distance from the point of attachment of the sleeve 19 is a collar or spider 21 carrying the field poles 22, which may be excited either by permanent magnets or by suitable windings. The armature 2 is provided with a commutator 3 on each side thereof and this armature and the commutators are carried by a common sleeve 23 which is mounted loosely on the shaft 1. The armature and commutators are held in stationary position by means of a suitable stationary projection 24, which engages a slot in the armature or is otherwise secured to the armature structure. Projections 24 are, of course, attached to stationary supports. As shown, they are fixed to projections on the housing 13.

The commutator adjacent the bracket 20 is for the purpose of measuring power and the commutator adjacent the bracket 20 for measuring the speed of rotation of the shaft. A pair of brushes 5' supported by suitable extensions of the spider 21, as shown in dotted lines in Fig. 11 bear on the speed commutator. Current is fed to the measuring instruments from both sets of brushes by suitable slip rings as shown.

The operation of this dynamometer is, in general, similar to that of the first form described, except that different parts of the dynamo are rotated and moved relative to one another. As the shaft is rotated under load the torsional twist of the section of the shaft between the point of attachment of the sleeve 19 and the point of attachment of the spider 21 causes the brushes and the field poles to be moved relative to one another, which has the same general effect on the voltage curve of the machine as moving the armature and commutator relative to one another in the first form. The extent of this relative motion determines the amount of character of the energy delivered by one of the commutators, which energy is, therefore, proportional to the product of the torque of the shaft and its speed of rotation.

Figs. 13 to 16, inclusive, illustrate a dynamometer applicable to two shafts connected by a disk clutch or the like.

One of the clutch members 25 is keyed to the driving shaft 1 while the other member 26 rotates loosely thereon, but is connected to the driven shaft through the medium of compression springs 27 which engage abutments on the member 26 and corresponding abutments on the arms of a collar 28 keyed to the driven shaft. When the clutch is operated the members 25 and 26 are connected together and the driven shaft is rotated through the medium of the springs 27 engaging the abutments on the collar 28 keyed to the driven shaft. When a load is being driven the member 26 moves relative to the driven shaft an amount corresponding to the compression of the springs 27. This movement is therefore a direct function of the torque. This relative movement is limited, however, by projections 27' on the members 26 engaging with the abutments on the collar 28 after predetermined relative movement between the collar 28 and said abutments.

The driven shaft has fixed thereto a gear 29 and loosely mounted on said shaft is a second gear 30 which is engaged by a projection 31 on the member 26 so that the gear 30 rotates with said member. The movement of the member 26 relative to the driven shaft moves the gear 30 relative to the gear 29, the extent of such relative movement corresponding to the compression of springs 27 and therefore to the torque of the driving shaft.

The gears 29 and 30 rotate respectively the commutator and armature of a direct current dynamo. This dynamo is shown in detail in Figs. 15 and 16.

It comprises, in general, a pair of field poles 32 between which rotates armature 33 keyed to shaft 34 carrying a gear 35 which meshes with the gear 30. The commutator 36 of the machine is mounted on a sleeve 37 concentric with the shaft 34 and arranged to rotate thereon. The sleeve 37 carries a gear 38 which meshes with the gear 29. The armature and commutator are connected by flexible leads 40 so that they may move relative to one another. The dynamo is inclosed in a suitable housing 41 which surrounds the parts and forms bearings for the shaft 34.

It will thus be seen that the dynamo is arranged so that the commutator and armature may be separately driven, it being necessary, of course, that they be driven at the same speed since the relative movement of one to the other is small being limited by the length of the flexible conductors 40 between the two. The gears 29 and 30 which drive the commutator and armature respectively, rotate at the same speed and move relative to one another only such distance as the springs 27 are compressed by the turning movement of the shaft.

The operation of this form of dynamometer is as follows:

When the clutch is operated the collar 26 is rotated with the driving shaft thereby rotating the driven shaft through the medium of springs 27 which engage the bosses on the collar 28 keyed to the driven shaft. The gear 29 is rotated with the driven shaft and the gear 30 with the member 26. If no load is being transmitted the gears 29 and 30 remain in approximately their normal position relative to one another, in which case the armature and commutator of the dynamo are in such position relative to one another than the brushes are at the no-voltage position on the commutator. When, however, the shaft is driving a load so that the springs 27 are compressed an amount corresponding to said load, the gear 30 moves relative to the gear 29 thereby moving the armature relative to the commutator and shifting the voltage curve of said commutator so that energy is delivered to the circuits connected to the brushes which is proportional in amount or character to the power transmitted by the shaft. The circuit of the dynamo is connected to suitable instruments which measure the energy and which may be calibrated to read directly in horse power or other power units. The dynamo can be arranged to indicate directly the speed of the rotating shaft by providing said dynamo with brushes located in the proper position and by calibrating the instruments connected to said brushes to read directly in speed.

Figs. 17 to 20, inclusive, illustrate an adaptation of the dynamo to the propeller shaft of a ship or to any other large rotating shaft. The dynamo 42 used in this form is similar in construction to that shown in Figs. 15 and 16; that is, it has an armature and commutator arranged to move relative to one another, each being rotated separately by gears meshing with the separate driving mechanisms, which rotate in response to the speed of the moving shaft and which driving mechanisms have a relative movement corresponding in amount to the torque of the moving shaft.

The dynamometer is shown as applied to a large size hollow shaft 43. The shaft has a gear 44 keyed thereto which meshes with a gear 45 for driving the armature of the dynamo. Fixed to the shaft at a point distant from the point of attachment of the gear 44 is a plug 46 supporting a rod 47 which carries an arm 48 projecting through a slot 49 in said shaft and engaging a gear 50 loosely mounted on the shaft. The gear 50 meshes with a gear 51 which drives the commutator of the dynamo. It will thus be seen that the two gears 44 and 50 rotate with the shaft and have a movement relative to one another corresponding in amount to the twist of the shaft under load between the point of attachment of plug 46 and the gear 44. The operation of the dynamometer is similar to that of the modification just described. It will, of course, be understood that the gear 50 could be rotated by suitable means located on the outside of the shaft when said shaft is solid, or when it is not convenient to fix a driving means on the interior of the shaft.

Fig. 20 illustrates a diagram of connections for the dynamo in the modification of Figs. 17 to 19, inclusive. The dynamo in this instance, is provided with four brushes, two of which supply energy to a power indicating instrument 52 and a power integrating instrument 53, and the other two of which supply energy to a speed indicating instrument 54. Both sets of brushes supply energy to a duplex power and speed recording instrument 55.

Figs. 21 and 22 illustrate another form of dynamometer for use in measuring the power of a flowing stream of fluid. The armature of the dynamo 56 is rotated by means of a shaft 57 which is in turn actuated by a propeller 58 responsive to the speed of flow of the fluid. The brushes of the dynamo are arranged to be moved by a rocker arm 59 controlled by a pressure cylinder 60, having a piston which is maintained in the normal position by a spring 61. The pressure cylinder communicates with the conduit through which the fluid flows by means of a pipe 62 so that the brushes are moved in response to the pressure of the flowing fluid. The dynamometer operates in the same general way as those previously described, except that the brushes are moved relative to the commutator instead of the commutator and armature being moved relative to one another. The armature rotates with a speed which is proportional to the speed of flow of the fluid and the brushes are moved an amount corresponding to the pressure or force of the fluid. The amount of energy delivered by the dynamo is accordingly proportional to the power of the fluid stream.

Fig. 23 shows a dynamometer applicable to the draw-bar between a locomotive and train or for similar purposes. The dynamo 63 in this dynamometer is rotated from the axle of one of the cars by means of a belt 64 or other suitable means so that the speed of the dynamo is proportional to the speed of the train. The draw-bar is represented by the link 65 which pulls the train against the compression of spring 66, which bears against a yoke 67 bolted or otherwise secured to the car or train. Of course, any other suitable yielding connection between the draw-bar of the locomotive and the train may be used. A rack 68 fixed to the draw-bar meshes with a rocker arm 69, which moves the brushes of the dynamo.

The armature of the dynamo is thus rotated in response to the speed of the train and the brushes assume a position which depends upon the draw-bar pull of the locomotive. Accordingly the energy delivered by the dynamo is proportional to the speed and the force so that it may be used for indicating the power delivered.

It will thus be seen that a dynamometer has been provided which is applicable to a wide variety of movable objects and mechanisms. The measuring instruments may be located at a distance from the dynamometer mechanism and may be varied in character and calibrated to indicate, record and integrate numerous quantities. The construction is simple, efficient and may be applied without requiring serious alterations in the objects whose power is to be measured.

It should be noted that the dynamometer is reversible and may be used to give reverse readings. If the rotation and twist are both reversed in direction, the power delivered to the measuring instruments is still in the same direction and gives a positive reading. If either the rotation or twist alone is reversed, the instruments give a negative reading thereby indicating that power is being delivered in a reverse direction through the apparatus whose power is being measured.

It will, of course, be understood that the structures shown are for purposes of illustration only and that other structures may be devised which embody the invention and which come within the spirit and scope of the appended claims.

What I claim is:

1. A dynamometer comprising a direct current dynamo and means for driving said dynamo at a speed proportional to the speed of movement of the body whose power is to be measured, and for changing the relative positions of the commutator and armature of said dynamo in response to the force applied to said body.

2. Means for measurng the power of a rotating shaft comprising a direct current dynamo and means attached to said shaft at longitudinally separated points thereon for driving the rotatable parts of said dynamo, and for shifting the position of certain of said rotatable dynamo parts in accordance with the torsional twist of said shaft between said points of attachment.

3. Means for measuring the power of a rotating shaft comprising a direct current dynamo and means attached to said shaft at longitudinally separated points thereon for driving the commutator and armature of said dynamo in response to the speed of rotation of said shaft, and for changing the relative positions of the commutator and armature of said dynamo in response to the torsional twist of said shaft under load.

4. A power measuring means comprising a direct current armature attached to a rotating shaft, a sleeve attached to said shaft at a point removed from the point of attachment of the armature, a commutator supported by said sleeve, flexible leads between said armature and commutator, stationary brushes normally bearing on said commutator at the no-voltage points thereof, and measuring instruments connected electrically to said brushes, whereby when the shaft is rotating under load the commutator is displaced relative to the armature so that a current is delivered in the circuit of said instruments which is a function of the speed of rotation of said shaft and the torque thereof.

5. A power measuring means comprising a direct current dynamo having its armature and commutator attached at different points to a rotating shaft, said armature and commutator being relatively movable so that they are displaced relatively by the torsional twist of the shaft under load whereby the output of the dynamo is a function of speed and torque of the shaft.

6. In an apparatus for measuring the power delivered by a power transmitting medium the combination of a dynamo having commutator brushes held in fixed position and means for driving said dynamo at a speed proportional to the velocity of the medium, and for angularly adjusting one of the parts of said dynamo with respect to said brushes a distance proportional to the force transmitted by the medium.

7. A direct current dynamometer comprising an armature attached to a rotating shaft whose power is to be measured, a sleeve attached to said shaft at a point remote from the point of attachment of the armature, a commutator supported by said sleeve whereby the armature and commutator have a movement relative to one another corresponding to the twist of said shaft under load between the points of attachment, flexible leads between said armature and commutator, stationary brushes normally bearing on said commutator at points of zero-voltage and measuring instruments electrically connected to said brushes to indicate and record directly the power of said shaft.

8. Means for measuring the power of a rotating shaft comprising a direct current dynamo, having its armature connected to rotate in response to the speed of rotation of said shaft and means connected to said shaft at a point remote from the point of connection of said armature for rotating the commutator of said dynamo independently of said armature whereby said commutator and armature may have a relative movement in accordance with the relative movements of their respective points of connection to said shaft, flexible leads between said armature and commutator and stationary brushes bearing on said commutator having electrical measuring instruments connected thereto for measuring the energy output of said dynamo.

9. Means for measuring the power of a rotating shaft comprising a direct current dynamo, means attached to said shaft at longitudinally separated points thereon for driving the rotatable parts of said dynamo, and for shifting the position of said rotatable dynamo parts in accordance with the torsional twist of said shaft between said points of attachment, and means in the circuit of said dynamo for indicating the power of said rotating shaft.

10. An electrical dynamometer comprising a direct current armature attached to a rotating shaft, a commutator attached to said shaft at a point remote from the point of attachment of the armature, flexible leads between said armature and commutator, stationary brushes normally bearing on said commutator at the no-voltage position thereof, other stationary brushes bearing on said commutator at the maximum voltage position thereof and measuring instruments connected electrically to said brushes to indicate directly the power and speed of the rotating shaft.

11. Means for measuring the power of a rotating shaft comprising a direct current dynamo, means attached to said shaft at longitudinally separated points thereon for driving the rotatable parts of said dynamo, and for changing the position of certain of said rotatable dynamo parts in accordance with the torsional twist of said shaft between said points of attachment, and means for limiting the torsional twist of said shaft to prevent said shaft being strained beyond its elastic limit.

12. Means for measuring the power of a rotating shaft comprising a direct current dynamo, means attached to said shaft at longitudinally separated points thereon for driving the commutator and armature of the dynamo in response to the speed of rotation of said shaft, and for changing the relative position of the commutator and armature of said dynamo in response to the torsional twist of said shaft under load, and means for limiting the torsional twist of said shaft to prevent said shaft being twisted beyond its elastic limit.

13. A power measuring means comprising a direct current armature attached to a rotating shaft, a commutator supported by a sleeve attached to said shaft at a point removed from the point of attachment of the armature, flexible leads between said armature and commutator, stationary brushes normally bearing on said commutator at the no-voltage points thereof and measuring instruments connected electrically to said brushes whereby when the shaft is rotated under load the commutator is displaced relative to the armature an amount corresponding to the twist of said shaft between the points of attachment of said armature and commutator so that a current is delivered in the circuit of said instruments which is a function of the speed of rotation of said shaft and the torque thereof, said commutator supporting sleeve being adapted to engage a projection on said shaft to limit the torsional twist of said shaft to prevent it being twisted beyond its elastic limit.

14. An apparatus for measuring the power of a rotating shaft comprising a direct current armature attached to said shaft at one point thereon, a commutator attached to said shaft at a point removed from the point of attachment of the armature, flexible electrical connections between the armature and commutator to allow relative movement of said parts in accordance with the twist of said shaft between the points of attachment and means for limiting the twist of said shaft to prevent it being strained beyond its elastic limit.

15. An apparatus for measuring the power of a rotating shaft comprising an armature connected to said shaft at one point thereon, a commutator supported by a sleeve attached to said shaft at a point removed from the point of attachment of said armature, flexible electrical connections between said commutator and armature to allow relative movement thereof in accordance with the torsional twist of said shaft between the points of attachment, said sleeve being adapted to be connected as a portion of said shaft after the shaft has twisted a certain amount to thereby prevent said shaft being strained beyond its elastic limit.

16. Means for measuring the power of a rotating shaft comprising a direct current dynamo having two sets of elements, one set comprising the field coils and the commutator brushes and the other set comprising the armature and commutator, the elements of one of said sets being relatively fixed and the elements of the other of said sets being attached to different parts of the shaft whereby the torsional twist of the shaft between the points of attachment of said last named elements will displace them relative to each other for the purpose described.

17. Means for measuring the power of a rotating shaft comprising a direct current dynamo having relatively shiftable parts connected to said shaft at different points thereon, one of said parts of the dynamo being shifted relative to the other part by the twisting action of the shaft between said points of connection.

18. Means for measuring the power of a rotating shaft comprising a direct current dynamo having rotatable parts thereof attached to said shaft at longitudinally separated points thereon, whereby the rotatable parts of the dynamo are driven by the shaft, the position of certain of said rotatable dynamo parts being shifted in accordance with the torsional twist of said rotating shaft between the points of attachment.

In witness whereof, I have hereunto subscribed my name in the presence of two witnesses.

WILMER M. SHALLCROSS.

Witnesses:
L. C. SCHANTZ,
L. D. MASON.